US011637954B2

(12) United States Patent
Tocher et al.

(10) Patent No.: US 11,637,954 B2
(45) Date of Patent: Apr. 25, 2023

(54) CAMERA (71) Applicant: NCTech Ltd, Edinburgh (GB)

(72) Inventors: Neil Tocher, Edinburgh (GB); Cameron Ure, Edinburgh (GB)

(73) Assignee: NCTECH LTD, Edinburgh (GB)

(*) Notice: Subject to any disclaimer, the term of this patent is extended or adjusted under 35 U.S.C. 154(b) by 444 days.

(21) Appl. No.: 14/349,604

(22) PCT Filed: Oct. 5, 2012

(86) PCT No.: PCT/EP2012/069800
§ 371 (c)(1),
(2) Date: Apr. 3, 2014

(87) PCT Pub. No.: WO2013/050576
PCT Pub. Date: Apr. 11, 2013

(65) Prior Publication Data
US 2014/0253678 A1 Sep. 11, 2014

(30) Foreign Application Priority Data
Oct. 5, 2011 (GB) .................................... 1117143

(51) Int. Cl.
H04N 5/232 (2006.01)
H04N 5/225 (2006.01)
G01S 17/08 (2006.01)
G01S 7/48 (2006.01)
G03B 37/04 (2021.01)
(Continued)

(52) U.S. Cl.
CPC ......... H04N 5/23232 (2013.01); G01C 15/00 (2013.01); G01S 7/4817 (2013.01); G01S 17/08 (2013.01); G01S 17/86 (2020.01); G01S 17/89 (2013.01); G03B 37/04 (2013.01);
(Continued)

(58) Field of Classification Search
None
See application file for complete search history.

(56) References Cited

U.S. PATENT DOCUMENTS 4,994,670 A 2/1991 Noble et al.
5,657,073 A 8/1997 Henley
(Continued)

FOREIGN PATENT DOCUMENTS

EP 2518995 A1 10/2012
JP 2006-033513 A 2/2006
(Continued)

OTHER PUBLICATIONS

International Searching Authority, International Search Report and Written Opinion for International Application No. PCT/EP2012/069800, dated Jun. 12, 2013, 14 pages, European Patent Office, The Netherlands.
(Continued)

Primary Examiner — Mikhail Itskovich
(74) Attorney, Agent, or Firm — Alston & Bird LLP (57) ABSTRACT A camera (10) that has four imaging means (12), each arranged to capture a different field of view and each associated with a separate sensor or detector (20). Each imaging means (12) is tilted to capture light from a zenith above the camera. The four imaging means (12) are equally spaced around a central axis, so that each contributes around a quarter of the scene being imaged.

19 Claims, 9 Drawing Sheets (51) Int. Cl.
*G01S 7/481* (2006.01)
*G01S 17/89* (2020.01)
*G01C 15/00* (2006.01)
*G01S 17/86* (2020.01)

(52) U.S. Cl.
CPC ......... *H04N 5/2258* (2013.01); *H04N 5/2259* (2013.01); *H04N 5/23238* (2013.01)

(56) References Cited

U.S. PATENT DOCUMENTS

| | | | |
|---|---|---|---|
| 5,900,909 A | 5/1999 | Parulski et al. | |
| 2004/0027451 A1* | 2/2004 | Baker | H04N 5/2259 348/46 |
| 2004/0042782 A1 | 3/2004 | Yoshikawa et al. | |
| 2004/0246333 A1 | 12/2004 | Steuart | |
| 2006/0197867 A1 | 9/2006 | Johnson et al. | |
| 2010/0045774 A1 | 2/2010 | Len et al. | |
| 2010/0097443 A1 | 4/2010 | Lablans | |
| 2010/0110259 A1 | 5/2010 | Hsu | |
| 2010/0182396 A1* | 7/2010 | Kroepfl | G01S 19/14 348/36 |
| 2010/0245539 A1 | 9/2010 | Lin | |
| 2010/0245601 A1 | 9/2010 | Kato | |
| 2011/0149094 A1 | 6/2011 | Chen et al. | |
| 2012/0162360 A1 | 6/2012 | Ohtomo et al. | |

FOREIGN PATENT DOCUMENTS

| | | |
|---|---|---|
| JP | 2009-294523 A | 12/2009 |
| JP | 2010-276977 A | 12/2010 |
| WO | WO 1997/050252 A1 | 12/1997 |
| WO | WO 2009/022178 A1 | 2/2009 |
| WO | WO 2010/121506 A1 | 10/2010 |
| WO | WO 2011/040239 A1 | 4/2011 |
| WO | WO 2011/078244 A1 | 6/2011 |

OTHER PUBLICATIONS

Stmicroelectronics, LSM303DLM Sensor Module: 3-Axis Accelerometer and 3-Axis Magnetometer, Apr. 2011, Doc ID 018725 Rev 1, 38 pages, STMicroelectronics NV.
Intellectual Property Office, Search Report under Section 17(5) for Application No. GB1117143.6, dated Nov. 25, 2011, 10 pages, UK.
European Patent Office, Communication pursuant to Article 94(3) EPC for Application No. 12778984.0, dated Jun. 6, 2017, 5 pages, Germany.

* cited by examiner

CAMERA

CROSS REFERENCE TO RELATED APPLICATIONS

This application is a National Stage Application, filed under 35 U.S.C. § 371, of International Application No. PCT/EP2012/069800, filed Oct. 5, 2012, which claims priority to Great Britain Application No. 1117143.6, filed Oct. 5, 2011, the contents of both of which are hereby incorporated by reference in their entirety.

BACKGROUND

Related Field

The present invention relates to a camera. In particular, the present invention relates to a fixed lens panoramic camera that has a substantially three hundred and sixty degree field of view.

Description of Related Art

Panoramic cameras are designed to provide a wide angle view of a scene. There are two basic types of camera: a rotating head camera, which is physically rotated to allow a panoramic image to be captured, and a fixed lens camera. Rotating head cameras provide a three hundred and sixty degree field of view, but they require a mechanical drive to cause physical rotation of the camera. Consequently, rotating head cameras tend to be large and relatively complex. Fixed lens cameras rely on wide angle lenses to capture images of a scene, which are then stitched together. Fixed lens cameras generally require complex optical arrangements to ensure that a three hundred and sixty degree field of view can be captured.

WO 9750252 describes a fixed lens panoramic camera. The camera has a convex mirror for capturing light of the surrounding panorama, an astigmatic lens for correcting astigmatism, a camera objective lens for converging light to a single point, a field flattening lens for converting polar format images into two-dimensional planar images, and an image capture mechanism for capturing optimized two-dimensional annular images of the surrounding panorama. A problem with this camera is that it is bulky and the optics are relatively complex. This makes it unsuitable for many applications.

BRIEF SUMMARY

According to the present invention, there is provided a camera that has four imaging means, each arranged to capture a different field of view, each field of view being associated with a separate sensor or detector, so that the camera is operable to capture four separate images, wherein each field of view is tilted to capture light from a zenith above the camera. The four lenses are equally positioned around a central axis, so that each contributes around at least a quarter of the scene being imaged. Preferably, the camera has an external volume of around 10 cm$^3$ or less.

By providing four fields of view and associated sensors/detectors, a 360 degree image of a scene can be captured. This can be achieved using simple, robust components. Each sensor or detector may comprise an array of sensors of detectors. Each field of view may be defined by one or more lenses.

A single cradle may be provided for locating and accurately aligning all four of the detectors and their associated lenses. The cradle may be shaped to ensure that each sensor is mounted with the same tilt, for example a 20 degree tilt. Using a single piece mount allows for minimum parts and easy assembly and is extremely rugged and durable.

As an alternative to a single cradle, each imaging means may be physically paired with a sensor, and located within a single element, so that their physical positions are fixed prior to insertion into the camera. This allows multiple imaging means, typically lenses, and sensors to be tested and calibrated as a single assembly calibration step. This allows calibration to be done externally from the camera unit.

According to another aspect of the invention, there is provided a camera that has multiple imaging means each arranged to define a different field of view, a sensor associated with each imaging means, and alignment means for aligning the imaging means and the sensor, wherein the alignment means is adapted to engage with an active surface of the sensor.

The alignment means may have a recess for receiving the sensor, and the recess is shaped to engage with the active surface of the sensor, and provide an opening to allow light from the imaging means to fall on the sensor. The alignment means may comprise an alignment cylinder that is adapted to receive the imaging means at one end and the sensor at the other.

The camera may comprise a case or housing. Each alignment means, lens and sensor may form an integral unit that is fitted in the case or housing.

The alignment means may have a fixing means at one end for fixing the imaging means in place; optionally the fixing means may comprise a thread for mating with a corresponding thread on the imaging means.

According to yet another aspect of the invention, there is provided an optical device for use in a camera, the optical device comprising an imaging means, a sensor and an alignment means, wherein the alignment means are adapted to optically align the imaging means and the sensor and the device forms an integral unit for insertion in the camera.

The alignment means may have a recess for receiving the sensor, and the recess is shaped to engage with an active surface of the sensor, and provide an opening to allow light from the imaging means to fall on the sensor. The alignment means may comprise an alignment cylinder that is adapted to receive the imaging means at one end and the sensor at the other. The alignment means may have a fixing means at one end for fixing the imaging means in place; optionally the fixing means may comprise a thread for mating with a corresponding thread on the imaging means.

According to yet another aspect of the invention there is provided a camera that has multiple imaging means for simultaneously capturing images of multiple fields of view, wherein between the multiple fields of view is at least one blind spot, and an external part of the camera extends into the blind spot. The camera may have at least three fields of view and at least three blind spots and the parts of the camera that extend into the blind spots protect the imaging means and/or act as feet or supports for the camera.

According to still another aspect of the invention, there is provided a laser scanner comprising a laser for scanning a scene and a camera that has multiple fields of view for simultaneously capturing a panoramic image of the scene. The camera may be mounted on the laser scanner. The camera preferably has a 360 degree field of view. The camera may be configured to transfer image data captured to a memory in a scanner unit, optionally wherein the transfer is done via cable, wifi or bluetooth. Means may be provided for automatically stitching together images from the multiple fields of view of the camera to provide a single panoramic image.

According to a still further aspect of the invention, there is provided a camera comprising imaging means for capturing an image; an orientation sensor for determining the orientation of the camera at the time the image is captured, and means for correcting the image captured in the event that the orientation sensor detects that the camera is not horizontally aligned.

The camera may have four imaging means, each arranged to capture a different field of view, each field of view being associated with a separate sensor or detector, so that the camera is operable to capture four separate images. The four imaging means may be equally spaced around a central axis, so that each contributes around at least a quarter of the scene being imaged. Each imaging means may be tilted to capture light from a zenith above the camera.

A single cradle or housing may be provided for locating and aligning all four of the imaging means and their associated detectors. The cradle may be shaped to ensure that each imaging means and each sensor are mounted with the same tilt.

According to yet another aspect of the invention there is provided an imaging system that includes an imager for capturing an image of a scene and a camera as claimed in any of claims 1 to 30 for capturing another image of a scene. Means may be provided for causing simultaneous capture of an image using the imager and the camera. Means may be provided for overlaying the image from the imager and the image from the camera. A display may be provided for displaying the overlaid images. The imager may be a thermal imager or a laser scanner.

BRIEF DESCRIPTION OF THE FIGURES

Various aspects of the invention will now be described by way of example only and with reference to the following drawings, of which:

FIG. 2(*a*) is a perspective view of a partially sectioned top portion of the housing of the camera of FIG. 1;

FIG. 2(*b*) is a perspective view of another partially sectioned portion through a housing of the camera of FIG. 1;

FIG. 6(*a*) is a cross section through another four lens camera;

FIG. 6(*b*) is an expanded view of a part of the camera of FIG. 6(*a*);

FIG. 10(*a*) shows a fixed lens camera in accordance with the invention attached to a laser scanner;

FIG. 10(*b*) shows a fixed lens camera in accordance with the invention attached to a laser scanner tri-pod/mount;

DETAILED DESCRIPTION OF VARIOUS EMBODIMENTS

Figure 1:
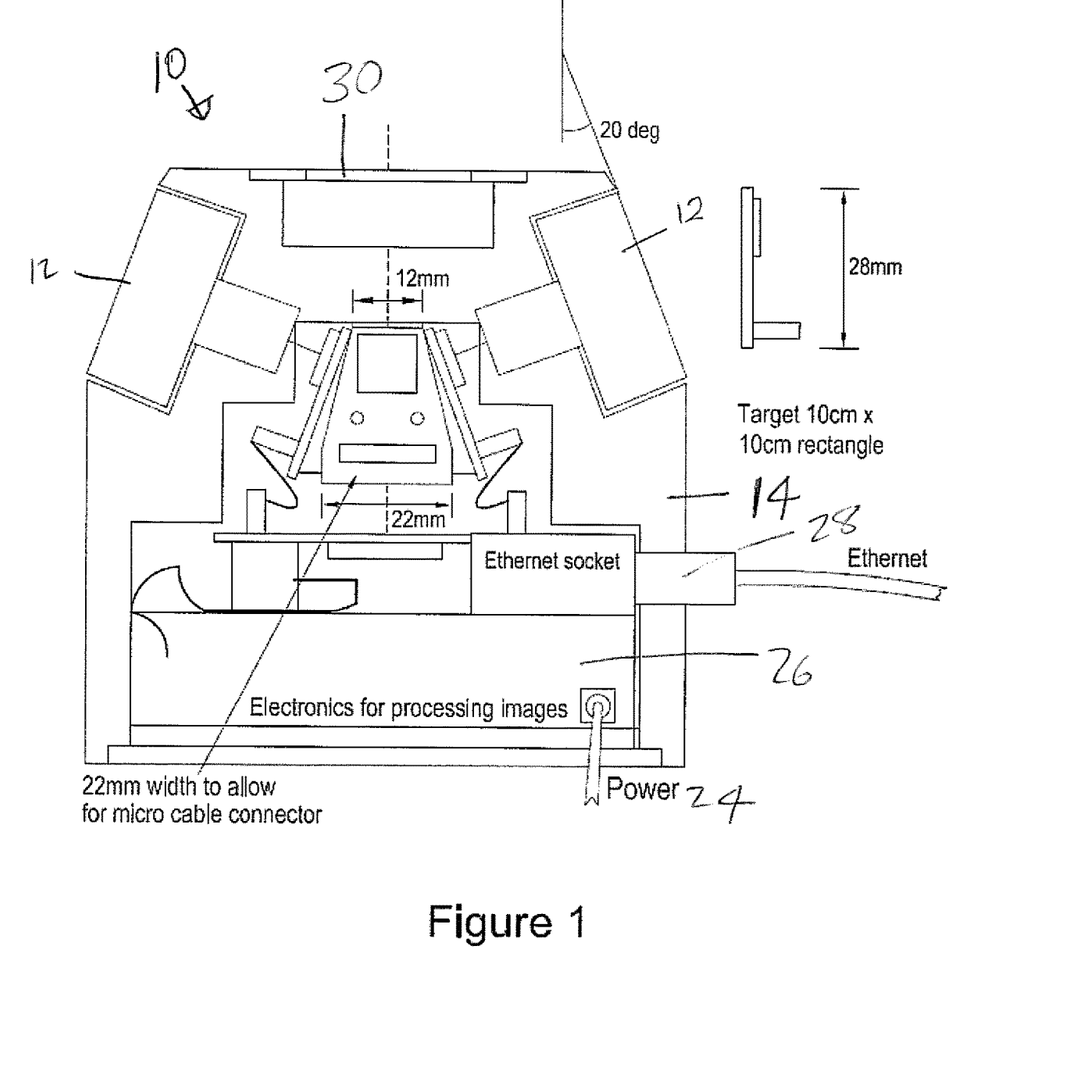
FIG. 1 is a cross-section though a four lens panoramic camera.
Figure 2A:
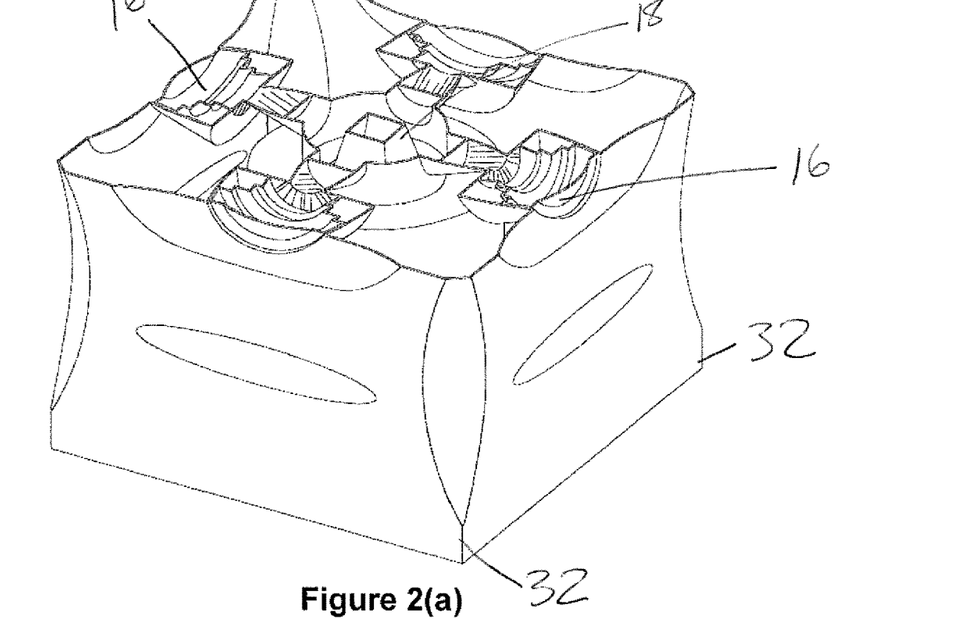
Figure 2B:
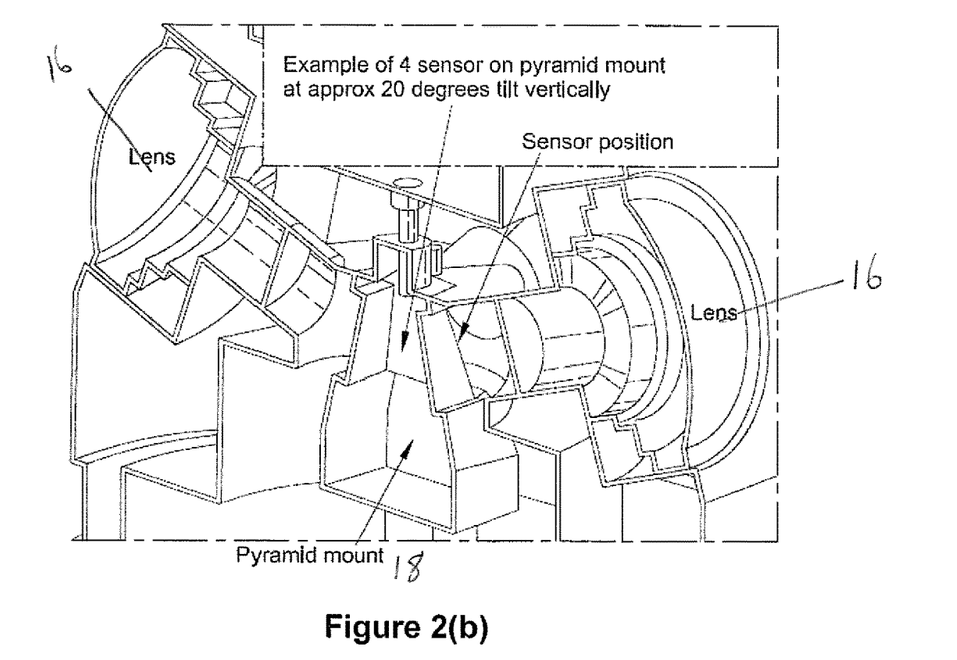

FIG. 1 shows a four lens camera 10 for capturing a panoramic image. FIG. 2 shows partially sectioned views of the camera housing. The camera of FIG. 1 has four wide angle lenses 12 (only two shown), each positioned on different external sides of a cube shaped housing. Four is the optimum number of lenses (no more or less, i.e. exactly four). Each lens 12 is titled at an angle of around twenty degrees relative to the vertical, so that light above the camera can be captured. Using four titled lenses 12 provides a 360×282.3 degree field of view without requiring any further lens/sensor arrangement to capture light above the camera 10.

Figure 3:
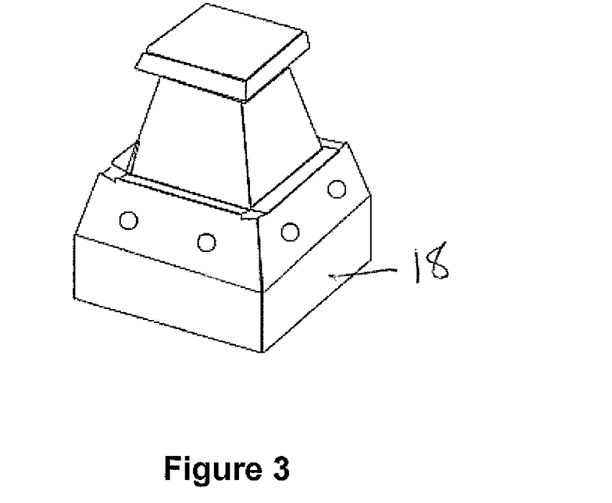
FIG. 3 is a perspective view of an internal part of the camera of FIG. 1.

The camera 10 has a one-piece housing 14 that has four external recesses 16, each shaped to receive and accurately locate field of view optics, typically one or more lenses. The housing also provides a support 18 for sensors 20 for sensing light from each of the field of view optics. The sensor support 18 is shown in more detail in FIG. 3. Using a single one-piece housing allows accurate placement of the lenses and sensors in the XYZ planes within a confined space, thereby helping eliminate parallax error. On each side of the support 18 a sensor 20 is mounted.

Each sensor 20 is paired with one of the lenses 12. Each sensor 20 is titled at the same angle and is centred on the same optical axis as its paired lens 12. In the example shown in FIGS. 1 and 2, each lens 12 and its associated sensor 20 are tilted by twenty degrees. In practice, the degree of tilt is defined by the field of view of each lens combined with how much of that view is captured on the sensor area. Sensor and lens pairs on opposite sides of the cube are symmetrically arranged.

The housing 14 holds the lenses 12 and all internal workings in place. The body 12 may be made from any suitable material, for example solid aluminium. The camera 10 is 10 cm³. The lens portion is 5 cm×10 cm. The single piece housing 14 allows for heat dissipation and provides extremely robust and durable protection against bumps, drops, dust, water and many other harsh environmental in use factors.

Each of the wide angle lenses 12 has a maximum, unimpeded field of view of around 180 degrees, but when in situ in the camera 10, each lens 12 has a more limited usable field of view. In particular, in the camera 10 of FIG. 1 the usable field of view is around 90 to 100 degrees. This limiting of the field of view of the lenses 12 is advantageous, as the image quality from each lens degrades towards the edges of the field of view. This limiting of the effective field of view can be done in software, i.e. merely by discarding certain data captured and/or by overscanning the sensors 20. Overscanning will be described in more detail later with reference to FIG. 5.

Figure 4:
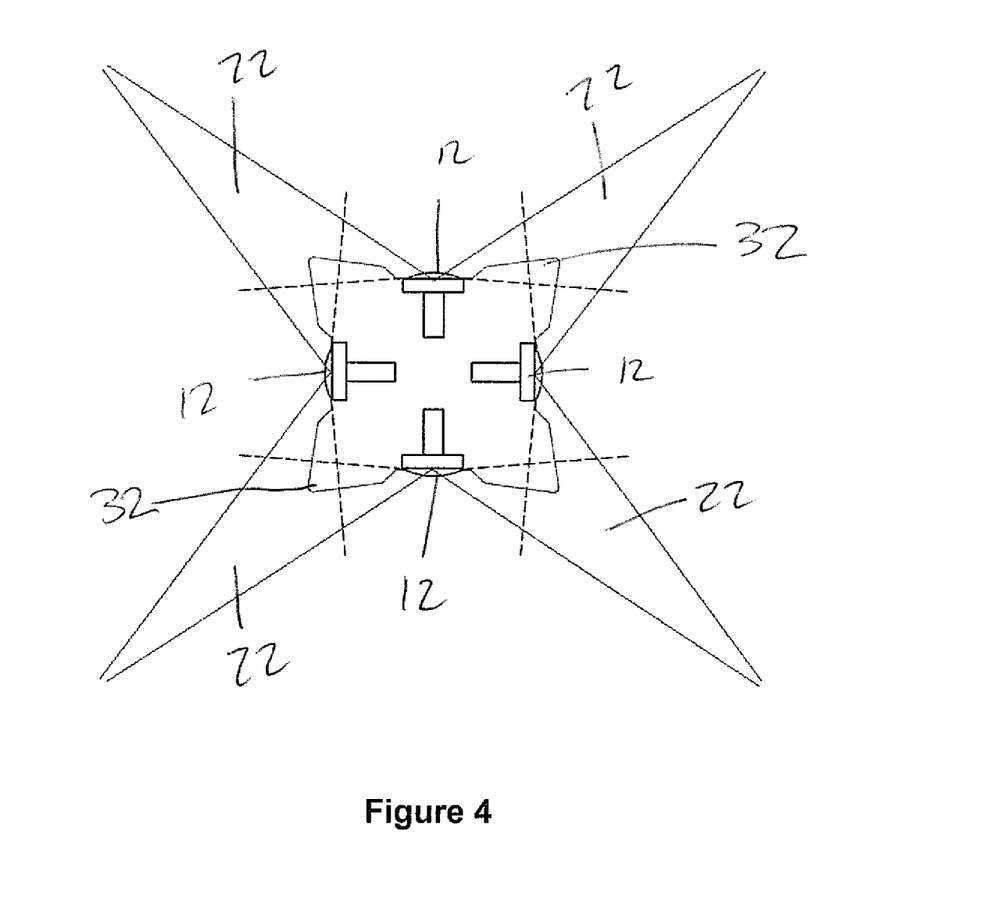
FIG. 4 shows the fields of view for each of the lenses of the camera of FIG. 1.

Limiting the usable field of view, in this case to around ninety degrees, means that the best quality parts of the image are used. This in turn means that the image quality is optimised. This is shown in FIG. 4. Here, the dotted lines show the intrinsic, unimpeded field of view of each lens 12 and the solid lines show the limited 90 degree field of view from each lens 12. Because of the lens 12 and sensor 20 layout, there are blind spots in the image field of the camera 10. These are the areas 22 defined by the solid lines in FIG.

4. The blind spots are defined to extend to around 1 metre from the camera. Whilst this limits imaging capability within the blind spots by resticting the light used to the best quality parts of the field of view of the lens, the accuracy of sight beyond 1 metre is improved. In practice, although the lenses nominally have 90 degree fields of view, in fact slightly more light is captured from each lens 12. This is advantageous, and provides overlap for later stitching of the images from each lens 12.

Figure 5:
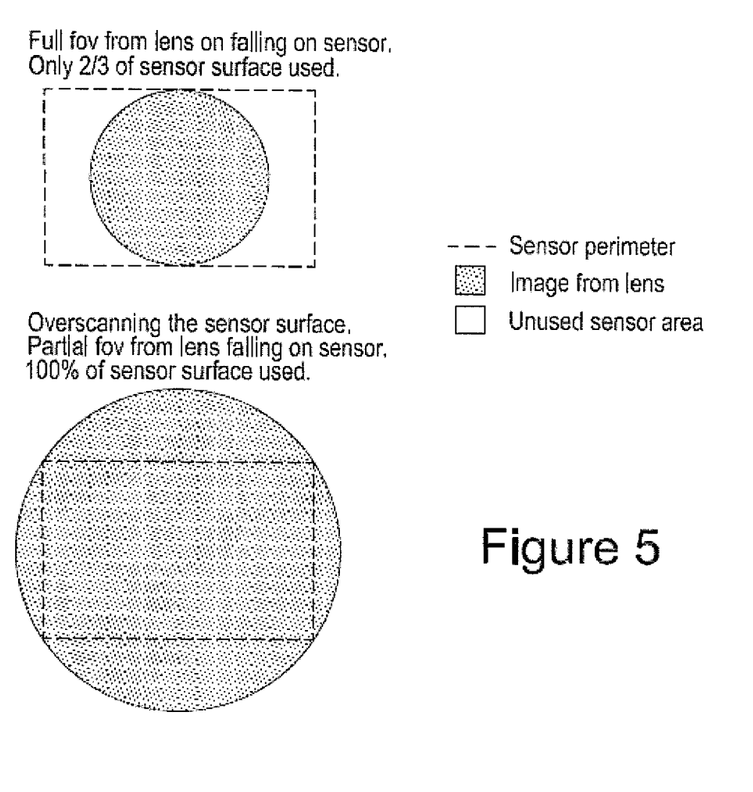
FIG. 5 shows the relationship between light imaged and the active sensor area.

Each sensor 20 is of a size that is smaller than the image projected from its associated lens 12, so that the sensor 20 is over-scanned. This is in contrast to conventional arrangements where typically only part of the active area of the sensor 20 is used. This is illustrated in FIG. 5. The conventional arrangement is shown in the upper part of FIG. 5. This shows that the sensor 20 is sized to be considerably larger than the full field of view from the lens. In contrast, in the camera of the present invention each sensor has a smaller surface area than the area of the light projected from its associated lens, as shown in the lower part of FIG. 5. Using over-scanning means substantially the whole of the sensor surface is used. The extent of the image projected onto the sensor 20 and the sensor size are matched to ensure that the best quality part of the imaged light falls on the sensor 20. This improves image quality. The combined effect of over-scanning and limiting of the usable field of view results in high quality image capture.

Included in the housing 14 is a power supply 24, for example a re-chargeable battery, control electronics, an on-board processor, a memory and software for receiving signals from the sensors and processing them to provide an image. Processing involves stitching images from each of the four lenses together to provide a single panoramic image. An ethernet connection 28 is also provided to allow internet or remote access. Wifi and/or bluetooth transceivers may also be included to allow wireless communications with the camera. On a top surface of the camera 10 is a screen 30 on which processed images can be viewed. Real time or stored images can be viewed.

The camera case design makes use of the blind spots shown in FIG. 4. These blind spots allow the external camera body to be extended directly into the field of view of each lens without the camera body being seen in the image. This can be seen most clearly in FIGS. 2 and 4, which show the corners of the camera housing projecting beyond the outer surface of the lenses and into the blind spot space. The projecting corners 32 protect the lenses 12 from damage and remove the need for multiple lens caps, which simplifies manufacture and helps keep the camera weight relatively low. They also reduce lens flare. This same blind spot technique allows the touch screen interface to be positioned directly above the lens array. This allows full operation of the camera from above, again with no moving parts or buttons. Further advantages of the prrojecting corners include providing an effective hand grip and improving heat dissipation (due to the additional metal in the projecting corners).

Figure 6:
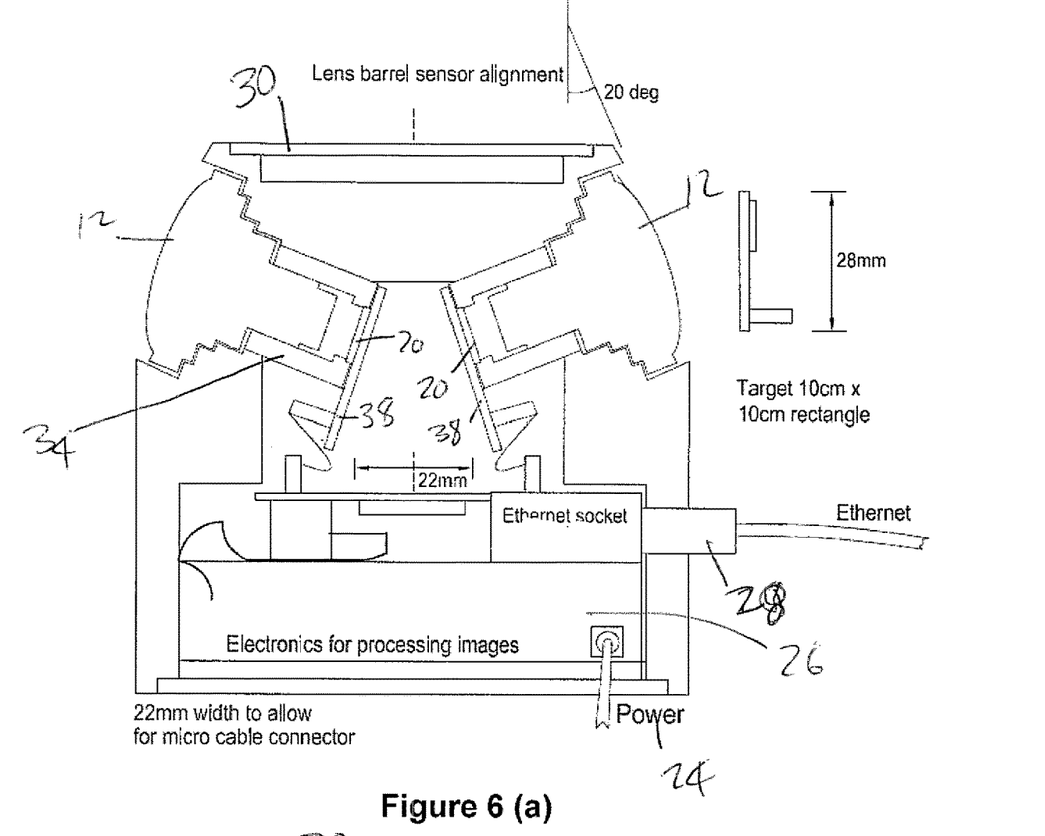

FIG. 6(a) shows another example of an internal layout for a four lens camera 10. The basic four lens arrangement is the same as for the camera 10 of FIG. 1, but here a mounting barrel 34 is used to locate the lens 12 and sensor 20 relative to each other, thereby to form an integral unit, before insertion into the camera housing 14. This means that the lens 12 and sensor 20 positioning and alignment can be precisely defined prior to insertion into the camera 10, which greatly simplifies assembly. FIG. 6(a) shows two of the integral units fitted into the casing of the camera. As before the lenses are symetrically positioned on each side of a generally cube shaped camera casing. FIG. 6(b) is an enlarged view of the lens/sensor units of FIG. 6(a).

Figure 7:
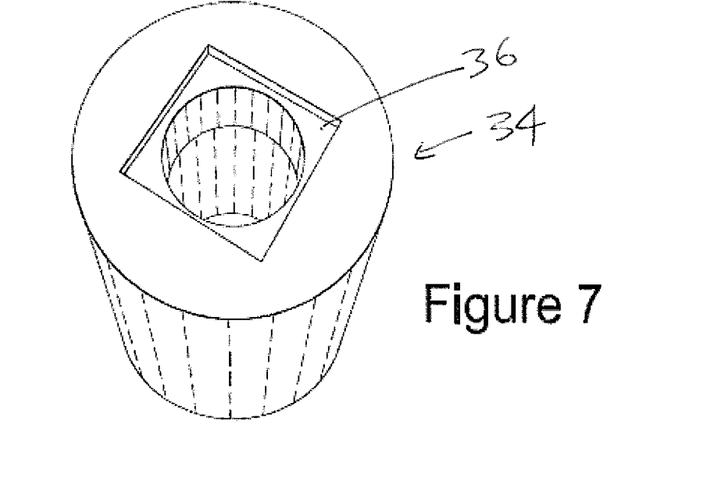
FIG. 7 a perspective view of a lens/sensor alignment barrel for use in the camera of FIG. 6.

FIG. 7 shows the lens/sensor barrel 34 in more detail. This is a cylindrical element that has a recess 36 at one end for receiving the sensor 20 and a threaded internal portion (not shown) at the other end for allowing the lens 12 to be screw fit into it. The sensor recess 36 on the barrel 34 is sized to closely match the sensor packaging, so that the packaging effectively sets the alignment in all axes. The sensor packaging typically has a cover glass on a front face. Tolerances in the XY plane are the machining accuracy of the location recess in the lens mount and the packaging of the sensor itself. Tolerances in the YZ and XZ planes are the machining accuracy of the lens recess and stack up of the sensor within its package relative to a cover glass on the front of the package. These parameters are significantly more controllable than those for traditional mounting designs.

Figure 8:
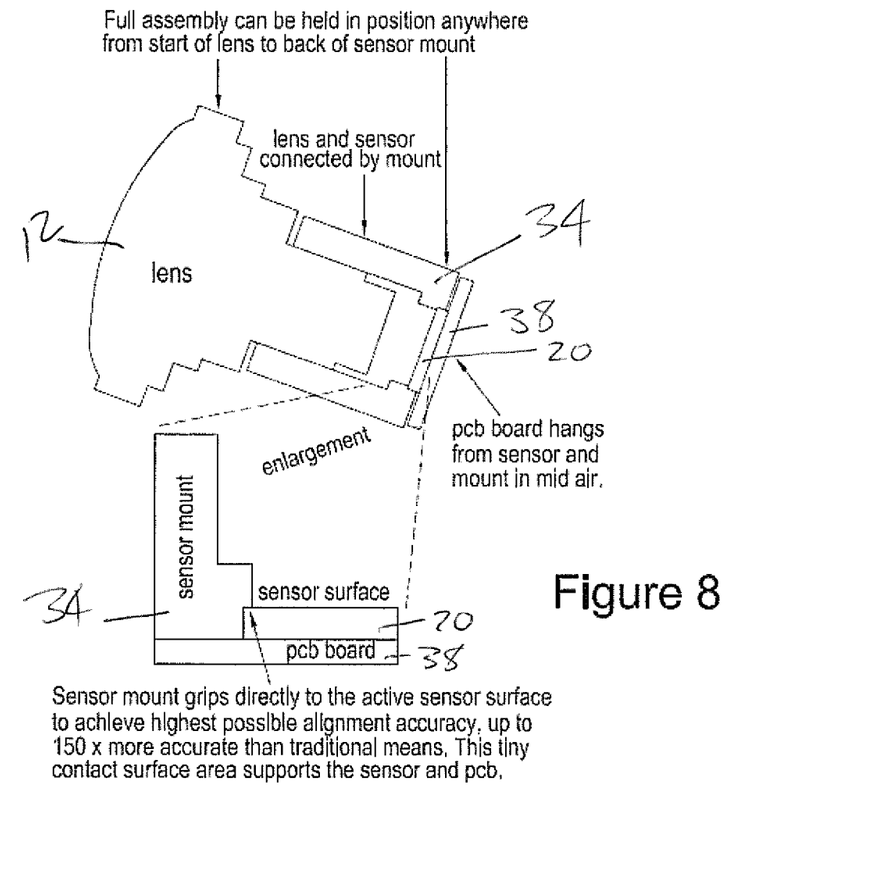
FIG. 8 shows a sensor located in the alignment barrel of FIG. 7.

FIG. 8 shows the sensor 20 located in the sensor recess 36 of the location barrel 34. The sensor 20 is mounted on a printed circuit board 38, to which electrical connections can be made for communicating with the sensor. The sensor itself has an active area that is enclosed in external packaging that defines an outer boundary. From this it can be seen that the active surface of the sensor is in direct contact with the sensor mount 34 and is held in place by contact of the printed circuit board 38 with the barrel 34. This ensures accurate alignment. The printed circuit board 38 can be secured to the barrel using any suitable fixing, for example the printed circuit board 38 can be secured using two or more screws. Care has to be taken when doing this, as pressure is applied directly to the active surface of the sensor.

Figure 9:
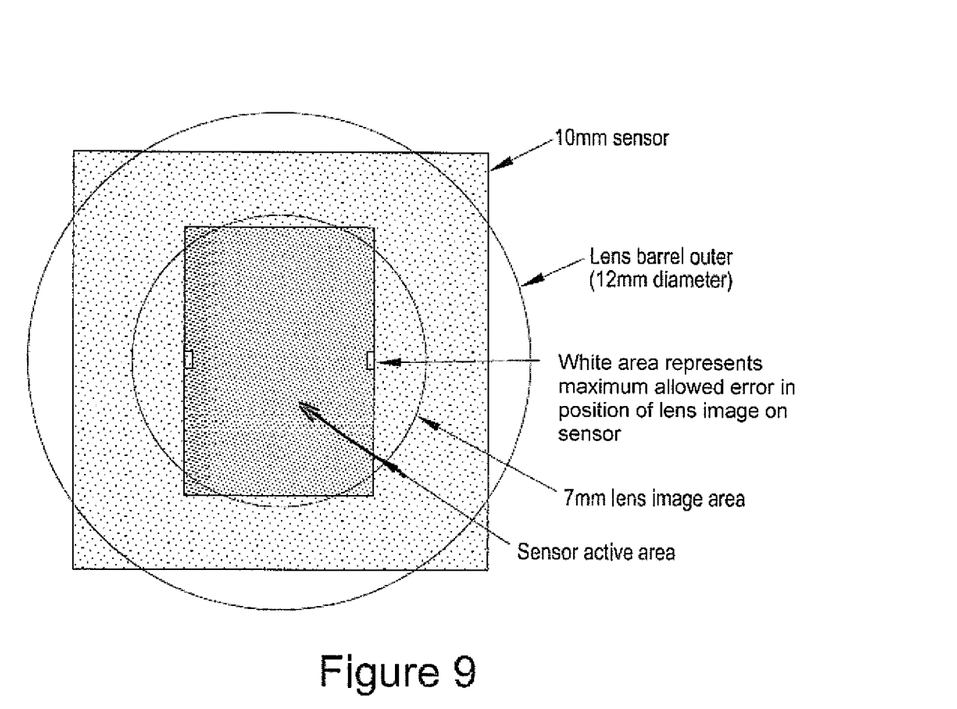
FIG. 9 shows the relationship between light imaged and the active sensor area for the lens barrel of FIG. 7.

FIG. 9 shows the relationship between the lens image area and the active sensor area for the lens/sensor barrel. Here, the outer square area is the full sensor, which fills the entire recess cut into the barrel. The inner square is the active sensor area, where image data is collected. The outer circle shows the lens thread diameter in relation to the sensor, illustrating that the lens and sensor are centred. The inner circle shows the actual light imaged from the lens onto the sensor. The corners of the active sensor area are not covered by the imaging light, and this where no image data/light is falling, therefore un-used. As mentioned previously, the lens 12 and sensor 20 are arranged so that the surface area of the light imaged onto the sensor is larger than that of the active area of the sensor itself. This optimises the quality of the beam incident on the active sensor area and ensures that as much as possible of the active sensor area is used.

The lens/sensor barrel 34 is used to align the sensor plane on all three axes with the lens, and ensure the image is centred on the sensor array. In some embodiments, the lens/barrel 34 is small enough to be inserted into the camera housing 14 through the lens holes. The trailing sensor cables can then be connected from inside the camera 10. The backplane of the lens 12 is mated with the camera body, thus ensuring a flush and accurate fit without the adjustment of the focus extension in the lens/sensor barrel affecting the protrusion of the lens from the body. This flush fit ensures the blind spot camera body lens protectors function within their designed tolerances. The lens/barrel unit 34 is secured in place by attaching the lens to the camera housing 14. The end of the barrel to which the sensor is attached is unsecured and floats relative to the housing 14.

Using the lens/sensor alignment barrel 34 each lens 12 can be paired with a sensor 20 prior to insertion into the camera body. This allows multiple lenses 12 and sensors 20 to be tested and calibrated as a single assembly calibration step to provide accurate live positioning verification prior to final bonding the assembly. This allows the calibration to be done externally of the camera, and fine tuning per lens and sensor.

The camera 10 includes a configuration file for calibrating the camera 10 as a whole. This is determined using results from all four lens/sensor sets. No camera 10 has the same configuration. The configuration file is stored in the camera and used to allow the camera 10 to manipulate image data very quickly. This enables extremely fast output of image data and live video feed.

The camera 10 has at least one tilt sensor (not shown) for sensing its tilt angle. For example, the camera 10 may include a tri-axis tilt sensor, such as an accelerometer, for example the LSM303DLM sensor from ST Microelectronics. This allows the tilt or orientation of the camera 10 relative to the horizontal to be determined. Also included in the camera 10 is image processing software for using the sensed tilt angle to correct image alignment, so that the image presented to the user on screen or saved in the memory is aligned to the horizontal regardless of the orientation of the camera 10.

The tilt information is used by the image processing software in the camera 10 to determine how to stitch the images from each of the lenses together, and how to present the image to the user keeping the horizon of the image relative to the user's view. If tilt sensors are not used and the camera 10 orientation is altered, the user's view will follow the orientation of the camera 10 at that point. Viewing a 360 degree image from the camera 10 of the invention allows a user to look around, above, below, back and forward. This is very confusing if the camera 10 is also moving, causing additional unexpected movement when a user is trying to control the view. Using tilt sensors allows the camera 10 to know which way up it is and its orientation. This information can be used by the image processing software to cancel out changes in the real orientation of the camera 10 from what the user wants to see. This allows a user to experience a stable and predictable view even when the camera 10 is moving in multiple axes.

The camera 10 may be designed to allow it to be mounted upside down. This allows it to be mounted on a pole allowing a large area below to be viewed. Inverting the camera 10 means that Zenith above the camera looks down, and the actual Zenith (previously the Nadir) is missing around 60 degrees. To correct for the inverted position, the tilt sensor can detect its orientation. In the event that the camera 10 detects it is up-side down, the on-board image processing software automatically inverts the processed output images to allow the image to be viewed the correct way round. As far as the user is concerned, the only indication that this has happened would be the position of the blind spot that is normally below the camera. Inversion of the camera causes the blind spot to move from the Nadir in the normal up right position to the Zenith in the inverted camera position.

The camera 10 may be arranged to allow a user to switch the orientation correction functionality off or on, as and when desired. This can be done using any form of user input either using an input on the camera 10 or a control input from a wireless device that is able to communicate with the camera 10 via the wi-fi or ethernet connection. When the orientation correction functionality is on, the image processing software uses the sensed tilt angle to correct image alignment, so that the image stored or presented is aligned to the horizontal regardless of the orientation of the camera.

Alternatively, the camera 10 may be operable to allow the user to set the desired orientation (i.e. not necessarily horizontal) in which case all corrections are made relative to the set orientation. When the orientation correction functionality is off, no correction is made for image alignment, so if the camera 10 is up-side down and facing a floor, then the image stored or presented is an image of the floor.

The camera 10 of the present invention can be used in numerous different ways and applications. As one example, the camera can be used with a laser scanner to provide an image of an area being scanned.

Laser scanners are widely used to capture detailed and accurate position information on scenes of interest. Laser scanners have a laser that sends highly directional beams of light to a scene and a detector for receiving light reflected back. The laser is rotated in use so that a wide field of view of a scene can be captured (in most cases the desired field of view is 360 degrees). Laser scanners are commonly used by architects and structural engineers for imaging complex buildings, where highly accurate position information is needed. Typically, the images captured are presented as three dimensional line drawings. However, this makes visualising the real scene difficult. In recent years, attempts have been made to overlay real photographic images with those captured by laser scanners. To do this, a known solution is to mount a single fixed lens camera on the laser scanner mount and rotate this whilst simultaneously capturing images of the scene. The images are then later stitched together to form a complete image. However, in practice, aligning the highly accurate laser scanner images with relatively inaccurate conventional images from a rotating camera 10 can be difficult.

Figure 10:
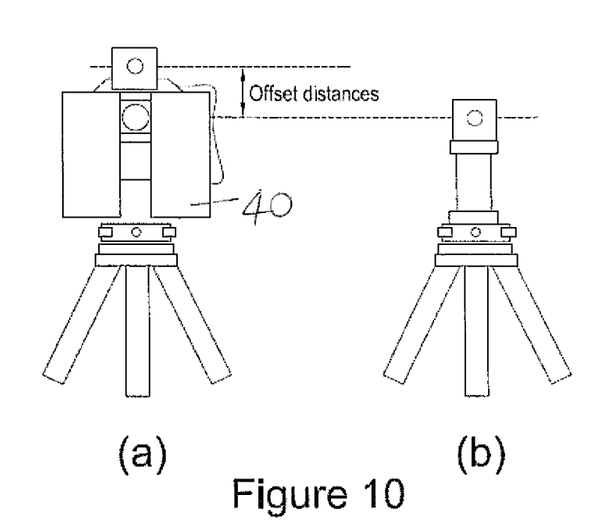

FIG. 10(*a*) shows a laser scanner that includes a fixed lens panoramic camera 10. The camera 10 can be of any of the various forms described herein. The camera 10 is mounted on top of the laser scanner unit 40. The camera processor is connected to a processor in the laser scanner, typically via a USB port, so that images captured by the camera can be automatically transferred to and stored in the scanner. The combined camera laser scanner arrangement is configured so that when a laser scan is initiated, a signal is sent from the scanner processor via the USB port to cause the fixed lens camera to capture a panoramic image. This image is transferred to the laser scanner where it is stored for later use. Once this is done, the laser is rotated and the laser scanner image captured as normal.

To avoid the camera imaging the scanner, the scanner should ideally be 45 degrees or lower in the FOV of the camera 10. To achieve this for a camera that is 10 cm$^3$, the offset distance is 225 mm. If the camera is 100 mm at its base, this blocks about 25 degrees (full angle) of the Zenith FOV of the laser scanner. Such a large offset distance is not desirable from a parallax point of view, but it allows the camera to operate with all four imagers at the same time.

In the arrangement of FIG. 10(*a*), because the camera 10 is mounted at a different level to the laser scanner, it suffers from offset distance parallax, and so some correction of the images is needed to take into account the slightly different image perspectives. An alternative arrangement avoids this by providing a camera 10 that can be fitted on a bracket that is sized to exactly position the camera 10 in the same place as the laser scanner, as shown in FIG. 10(*b*). The bracket may be fixed using any suitable arrangement, for example the bracket may be threaded at one end, so that it can be screwed into position on the scanner mount.

Figure 11:
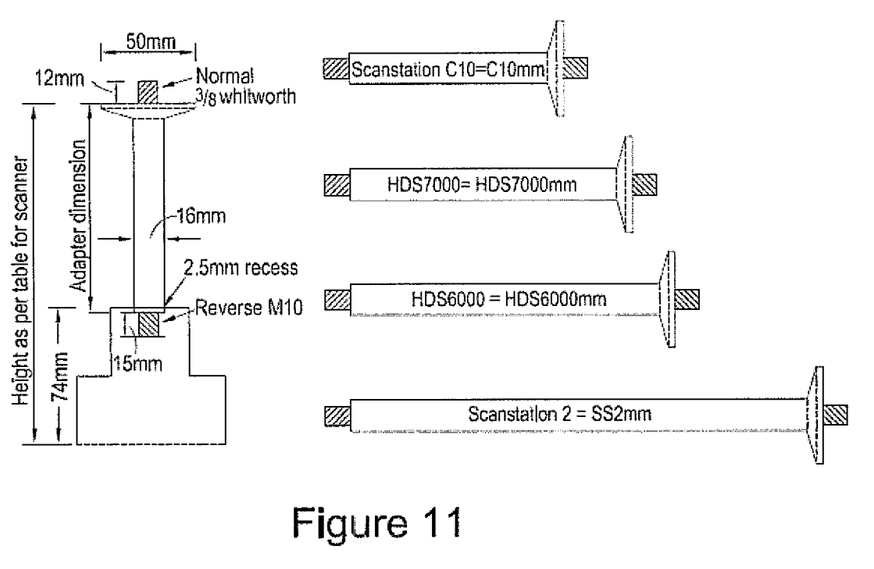
FIG. 11 shows various attachments for the arrangement of FIG. 9(*b*)

In use, the laser scanner is used to capture the image data. It is then removed from its mount and the camera on its bracket is put in place. A panoramic image of the scene is then captured. An advantage of this arrangement is that the camera 10 can capture an image of the scene at the same level as the laser scanner and there is no need to correct for parallax errors. To accommodate different scanner heights, a range of brackets or mounts may be provided, as shown in FIG. 11.

The image captured by the laser scanner and the image captured by the fixed lens camera are overlaid to provide a combined image that has detailed position information and a realistic, lifelike image of the scene. To ensure that the overlay is correct, one or more known targets are used to co-orientate the two horizontally. For example, if the image includes a building with a spire, the spire may be used as the alignment marked. Software for overlaying images in this way is known, for example the image processing applications provided by Point Tools.

The camera of the invention could also be used in conjunction with a thermal imaging camera. In this case, the camera is mounted on top of a thermal imaging unit and the camera processor is connected to a processor in the thermal imager (or alternatively each is controlled by the same external processor), typically via a USB port, so that images captured by the thermal imager and the camera can be automatically transferred and stored. The combined camera and thermal imager arrangement is configured so that when thermal imaging starts, a signal is sent to cause the fixed lens camera to capture a panoramic image. This image is transferred to the thermal imager where it is stored for later use to allow the thermal and visible light images to be compared and if desired overlaid. The image capture rate for the thermal camera and the fixed lens camera is preferably the same so that images are captured simultaneously. As before, ideally the thermal camera should be 45 degrees or lower in the FOV of the camera.

The camera of the invention can be used to capture still or moving, i.e. video, images. The frame rate is defined by the capture rate of the sensors. Ideally, the frame rate would be more than 10 frames per second for good resolution video.

The use of a four lens arrangement in the camera of the present invention provides numerous advantages over other lens arrangements. For example, using three lenses or fewer, as is most commonly done in fixed lens cameras, means that the same image is captured, but at lower resolution and clarity because all of the circular image has to fall on to the square/rectangular sensor. In practice, this means only two thirds of each sensor is in use. This equates to a loss of output resolution of 10 megapixel when 3×10 megapixel sensors used, and a loss of 6.7 megapixel when 2×10 megapixel sensors used. Also, resolution is compromised. Using five lenses or more allows for better resolution, but the downside is power consumption increases; battery life is reduced; the camera has to be relatively large physically; and the data rates increase, which means more software correction is required resulting in slower performance. The advantageous selection of four lenses allows relatively high resolution images to be captured, over a very wide field of view using a camera that is simple, robust and very small.

Figure 12:
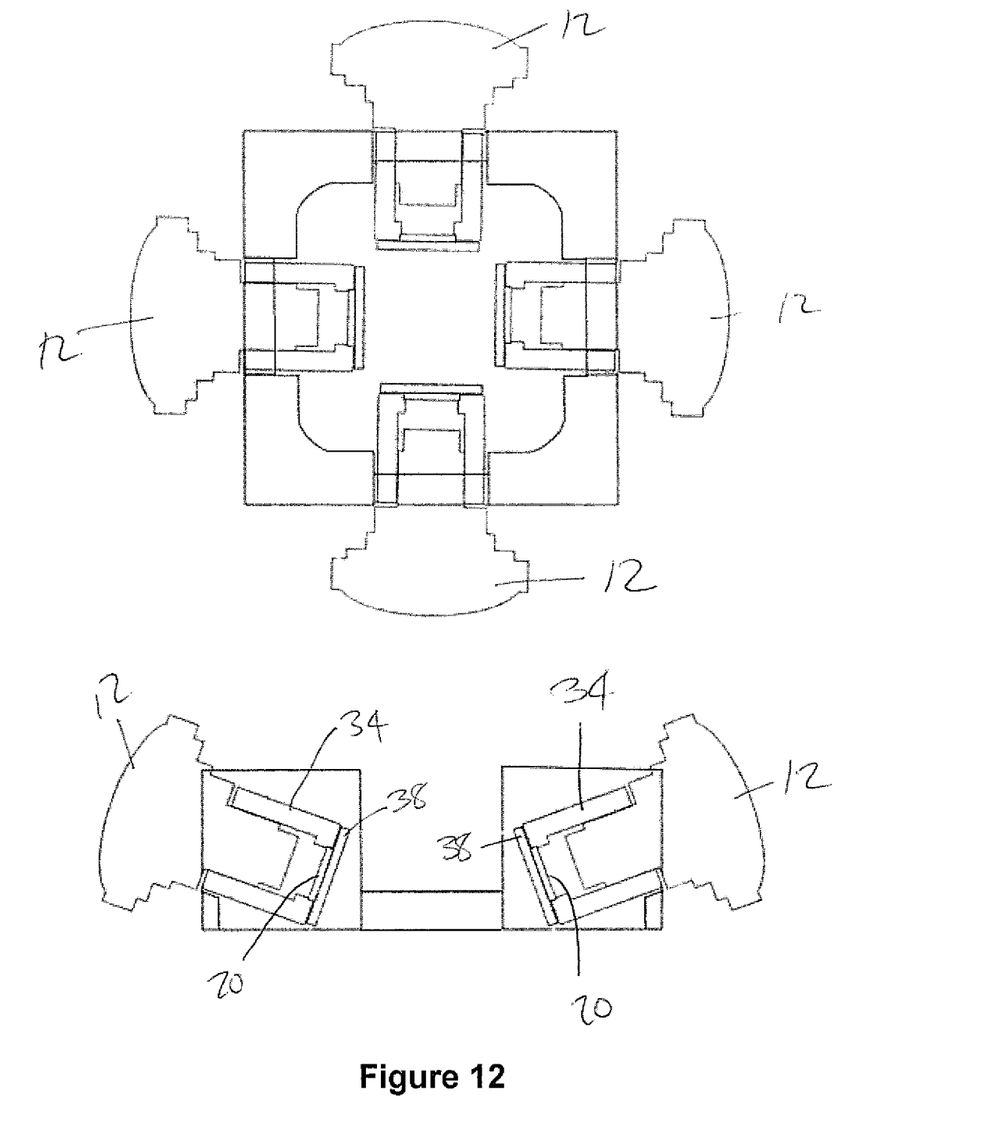
FIG. 12 shows an alternative lens mount arrangement.

A skilled person will appreciate that variations of the enclosed arrangement are possible without departing from the invention. For example, although the cradle shown in FIGS. 1 to 3 has titled lenses and a pyramidal sensor support with correspondingly titled sides, the lens support could be arranged to position the lenses substantially vertically, in which case the pyramidal sensor support could be replaced by a cube shaped support. Equally, whilst the lens mount of FIG. 7 is shown as a separate discrete element, it could instead be machined as part of a camera housing so as to form a single solid body for a camera. Furthermore, alternative mounting arrangements may be used for positioning the lenses and ensuring accurate alignment. For example, FIG. 12 shows a generally square base plate that has four side walls in each of which is defined a space for receiving a lens/sensor unit, such as shown in FIG. 8. On an internal surface of each side wall is a support block that has a sloped surface that is shaped to ensure the lens/sensor unit is tilted at the correct angle, in this case 20 degrees. Each unit is positioned on its sloped block. A cover is provided to fit over the base and clamp all four lens/sensor units into place. Accordingly, the above description of the specific embodiment is made by way of example only and not for the purposes of limitations. It will be clear to the skilled person that minor modifications may be made without significant changes to the operation described.

The invention claimed is:

1. A camera assembly for imaging a scene, the camera assembly consisting of:
   exactly four imaging means equally positioned around a central axis of the camera assembly, each imaging means consisting of a lens;
   exactly four separate sensors associated with the exactly four imaging means; and
   a single cradle mounting each of the exactly four separate sensors at a uniform angle providing a uniform corresponding tilt of each of the exactly four separate sensors and each of the respective lens,
   wherein:
   each of the exactly four imaging means is positioned to capture a different field of view defined by the lens of the respective imaging means,
   each field of view is provided to the associated separate sensor, so that the camera assembly captures four separate images, and
   the uniform angle at which each of the exactly four sensors is mounted is obliquely angled relative to the central axis of the camera assembly such that the uniform corresponding tilt of each of the exactly four separate sensors causes the exactly four imaging means to capture light from a zenith above, and lying on the central axis of, the camera assembly and to capture at least a quarter of the scene being imaged.

2. A camera assembly as claimed in claim 1, wherein the cradle is shaped to ensure that each imaging means and each sensor are mounted with the same tilt.

3. A camera assembly as claimed in claim 1, wherein the cradle includes a pyramidal sensor support, wherein sides of the pyramid are angled to be parallel with the tilt angle of the imaging means.

4. A camera assembly as claimed in claim 1, wherein each imaging means and sensor pair are provided in a location element that determines the relative positions of the imaging means and sensor.

5. A camera assembly as claimed in claim 1, wherein the sensors define an array of sensors.

6. A camera assembly as claimed in claim 1, wherein each field of view is defined by one or more lenses.

7. A camera assembly as claimed in claim 1, the camera having an external volume of around 10 cm$^3$ or less.

8. A camera assembly as claimed in claim 1, wherein the camera is configured to invert a captured image in the event that the orientation sensor indicates that the camera is upside down.

9. A camera assembly as claimed in claim 1, wherein the camera is shaped substantially as a cube, and wherein the imaging means are located symmetrically around four sides of the cube.

10. A camera assembly for imaging a scene, the camera assembly comprising:
   a cube-shaped casing; and
   an optical device defining an integral unit for insertion in the camera assembly and comprising:
      a first end secured to the casing,
      a second end unsecured such that it floats relative to the casing, the second end being opposite the first end,
      an imaging means consisting of a lens located at the first end,
      a sensor mounted on a circuit board located at the second end, and
      an aligner comprising a barrel that optically aligns the lens and the sensor, the lens and the barrel being secured in place by attachment of the lens to the casing, an end of the barrel to which the sensor is attached being unsecured and floating relative to the casing such that the circuit board hangs in mid-air.

11. An imaging system that includes an imaging device for capturing an image of a scene and a camera assembly as claimed in claim 1 for capturing another image of a scene.

12. An imaging system as claimed in claim 11 comprising a processor configured to overlay the image from the imaging device and the image from the camera.

13. An imaging system as claimed in claim 12 comprising a display for displaying the overlaid images.

14. An imaging system as claimed in claim 11, wherein the imaging device is selected from: a thermal imager and a laser scanner.

15. A camera assembly consisting of exactly four imaging means each consisting of a lens and associated sensors, each lens being tilted at the same corresponding angle as its associated sensor, each imaging means being oriented to capture a different field of view, each field of view being defined by the respective lens and provided to the associated separate sensor, so that the camera is operable to capture four separate images, wherein each imaging means is equally positioned around a central axis of the camera assembly and oriented at an angle that is oblique to the central axis so as to capture light from a zenith above the camera assembly and on the central axis.

16. A camera assembly as claimed in claim 15, wherein an active area of each sensor is a rectangle that is taller than it is wide.

17. A camera assembly as claimed in claim 16, wherein an active area of each sensor is in a portrait orientation.

18. A camera assembly as claimed in claim 15, wherein each imaging means comprises a lens that captures light from a zenith above the camera.

19. A camera assembly as claimed in claim 15, wherein each sensor is at an angle to the horizontal.

\* \* \* \* \*